US012286708B2

(12) United States Patent
Braley et al.

(10) Patent No.: US 12,286,708 B2
(45) Date of Patent: Apr. 29, 2025

(54) METHOD AND SYSTEM FOR FABRICATING AN ELECTRICAL CONDUCTOR ON A SUBSTRATE

(71) Applicant: The Boeing Company, Chicago, IL (US)

(72) Inventors: Daniel J. Braley, St. Peters, MO (US); Peter A. Wilson, Chesterfield, MO (US)

(73) Assignee: The Boeing Company, Arlington, VA (US)

( * ) Notice: Subject to any disclaimer, the term of this patent is extended or adjusted under 35 U.S.C. 154(b) by 670 days.

(21) Appl. No.: 17/525,162

(22) Filed: Nov. 12, 2021

(65) Prior Publication Data

US 2022/0074055 A1 Mar. 10, 2022

Related U.S. Application Data

(62) Division of application No. 16/409,999, filed on May 13, 2019, now Pat. No. 11,203,810.

(51) Int. Cl.
*C23C 24/04* (2006.01)
*B05B 7/14* (2006.01)
(Continued)

(52) U.S. Cl.
CPC ................ *C23C 24/04* (2013.01); *B05B 7/14* (2013.01); *B05B 7/16* (2013.01); *B05C 11/1005* (2013.01);
(Continued)

(58) Field of Classification Search
USPC ........ 118/308, 712, 302, 666, 667, 684, 689
See application file for complete search history.

(56) References Cited

U.S. PATENT DOCUMENTS 5,795,388 A * 8/1998 Oudard ................. B05B 7/1477 118/308
9,872,384 B2 1/2018 Braley et al.
(Continued)

FOREIGN PATENT DOCUMENTS

CA 103080378 5/2013
CN 1898025 1/2007
(Continued)

OTHER PUBLICATIONS

English Translation CN-108085675A (Year: 2018).*
(Continued)

*Primary Examiner* — Yewebdar T Tadesse
(74) *Attorney, Agent, or Firm* — Walters & Wasylyna LLC

(57) ABSTRACT

A system for spraying a coating material to a substrate includes an optical sensor that monitors a thickness, a controller that generates a first signal corresponding to an amount of gas propellant to be heated, a second signal corresponding to a temperature to which the gas propellant is to be heated, a third signal corresponding to an amount of a solid powder composition to be mixed with the heated gas, and a fourth signal corresponding to a distance between the nozzle and the substrate, a first regulator that supplies an amount of gas propellant corresponding to the first signal, a heater that heats the gas propellant to the temperature corresponding to the second signal, a second regulator that supplies an amount of solid powder composition corresponding to the third signal, and an actuator that moves the nozzle corresponding to the fourth signal.

20 Claims, 4 Drawing Sheets

(51) Int. Cl.

| | |
|---|---|
| ***B05B 7/16*** | (2006.01) |
| ***B05C 11/00*** | (2006.01) |
| ***B05C 11/10*** | (2006.01) |
| ***H01B 1/02*** | (2006.01) |
| ***H01B 1/04*** | (2006.01) |
| ***H01B 13/00*** | (2006.01) |

(52) U.S. Cl.

CPC ................. *H01B 1/02* (2013.01); *H01B 1/04* (2013.01); *H01B 13/0016* (2013.01); *H01B 13/0036* (2013.01)

(56) References Cited

U.S. PATENT DOCUMENTS

| | | | | |
|---|---|---|---|---|
| 2015/0194241 | A1 | 7/2015 | Tanielian | |
| 2015/0368535 | A1 | 12/2015 | Dardona et al. | |
| 2018/0238679 | A1* | 8/2018 | Sadovoy | C23C 4/134 |

FOREIGN PATENT DOCUMENTS

| | | | | |
|---|---|---|---|---|
| CN | 101285187 | | 10/2008 | |
| CN | 102286740 | | 12/2011 | |
| CN | 105706179 | | 6/2016 | |
| CN | 107403656 | | 11/2017 | |
| CN | 108085675 | A * | 5/2018 | C23C 14/3414 |
| CN | 108486565 | | 9/2018 | |
| EP | 3 092 652 | | 11/2016 | |
| EP | 3 252 778 | | 12/2017 | |
| EP | 3 396 021 | | 10/2018 | |
| WO | WO 2005/061116 | | 7/2005 | |
| WO | WO 2017/122137 | | 7/2017 | |

OTHER PUBLICATIONS

National Intellectual Property Administration, Office Action, App. No. 2020103106484 (Jun. 20, 2023).

China National Intellectual Property Administration, Office Action, App. No. 2020103106484 (Sep. 16, 2023).

China National Intellectual Property Administration, Office Action, with English translation, App. No. 2020103106484 (Jan. 1, 2024).

* cited by examiner

METHOD AND SYSTEM FOR FABRICATING AN ELECTRICAL CONDUCTOR ON A SUBSTRATE

PRIORITY

This application is a divisional of U.S. Ser. No. 16/409,999 filed on May 13, 2019.

FIELD

The present application relates to methods and systems for fabricating electrical conductors on a substrate and products formed therefrom.

BACKGROUND

Most electrical interconnections are made using high electrical conductivity metals, such as copper ($6\times10^7$ S/m), which has a density of approximately 9 g/cm$^3$. It is desirable to replace copper with a material that provides electrical performance that is as good as or better than copper, but at a much lower density.

Accordingly, those skilled in the art continue with research and development in the field of electrical conductor fabrication.

SUMMARY

In one example, the disclosed method for fabricating an electrical conductor on a substrate by cold spraying includes heating a gas propellant, propelling a solid powder composition that includes copper and highly oriented pyrolytic graphite using the heated gas propellant, and directing the solid powder composition towards the substrate at a velocity sufficient to cause the solid powder composition to undergo plastic deformation and to adhere to the substrate to deposit the electrical conductor thereon.

In one example, the disclosed system for spraying a coating material to a substrate includes an optical sensor, a controller, a first regulator, a heater, a second regulator, and actuator. The optical sensor is positioned to monitor a thickness of a coating material applied to a substrate. The controller is in communication with the optical sensor and, based on the measured thickness, generates a first command signal corresponding to an amount of gas propellant to be heated, a second command signal corresponding to a temperature to which the gas propellant is to be heated, a third command signal corresponding to an amount of a solid powder composition to be mixed with the heated gas in a nozzle, and a fourth command signal corresponding to a distance between the nozzle and the substrate. The first regulator receives the first command signal and supplies an amount of gas propellant corresponding to the first command signal. The heater receives the amount of gas propellant supplied from the first regulator, receives the second command signal, and heats the gas propellant to the temperature corresponding to the second command signal. The second regulator receives the third command signal and supplies an amount of solid powder composition corresponding to the third command signal to the nozzle. The actuator receives the fourth command signal and moves the nozzle along the substrate at a distance between the nozzle and the substrate corresponding to the fourth command signal.

In one example, the disclosed cold spray coated product includes a substrate and an electrical conductor deposited on the substrate by cold spraying. The electrical conductor includes a copper matrix and highly oriented pyrolytic graphite platelets dispersed in the copper matrix.

Other examples of the disclosed methods, systems, and products will become apparent from the following detailed description, the accompanying drawings and the appended claims.

DETAILED DESCRIPTION

Figure 1:
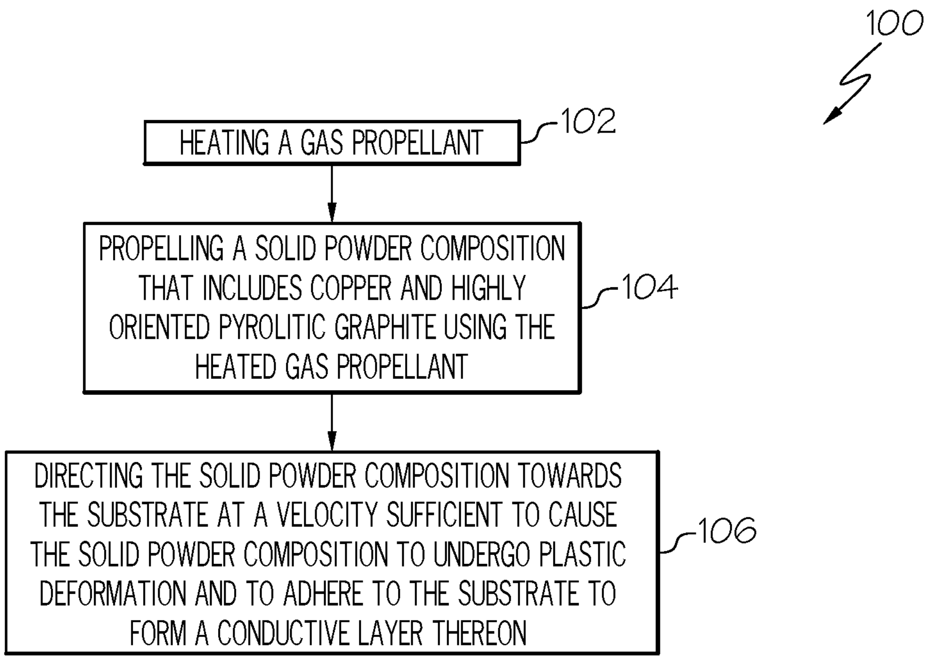
FIG. 1 is a flow chart depicting one example of the disclosed method for fabricating an electrical conductor on a substrate.

FIG. 1 is a flow chart depicting one example of the disclosed method 100 for fabricating an electrical conductor 304 (FIG. 3) on a substrate 302 (FIG. 3) by cold spraying. The method 100 includes heating 102 a gas propellant, propelling 104 a solid powder composition that includes copper and highly oriented pyrolytic graphite (HOPG) using the heated gas propellant, and directing 106 the solid powder composition towards the substrate 302 at a velocity sufficient to cause the solid powder composition to undergo plastic deformation and to adhere to the substrate 302 to deposit the electrical conductor 304 thereon. By way of the steps of propelling 104 and directing 106 of the solid powder composition towards the substrate 302, the method 100 deposits the electrical conductor 304 on the substrate 302 from the copper and the highly oriented pyrolytic graphite.

The step of heating 102 the gas propellant facilitates the step of propelling 104 the solid powder composition to a sufficient velocity. The gas propellant expands as it is heated, thus increasing the acceleration of the gas propellant and, thereby, increasing the velocity of the solid powder composition. Furthermore, heating the gas propellant also heats the solid powder composition. Heating the solid powder composition facilitates the plastic deformation and adherence of the solid powder composition to the substrate 302 (FIG. 3) to deposit the electrical conductor 304 (FIG. 3) thereon.

The step of heating 102 of the gas propellant can be performed in any manner. In an example, the gas propellant is heated to a suitable temperature by way of passing the gas propellant through a heat exchanger. In one example, the gas propellant is heated to a temperature in a range of 450 to 535° C. If the gas propellant is heated above 535° C., then the solid powder composition may be adversely affected. Particularly, the properties of the highly oriented pyrolytic graphite become degraded. Also, the substrate 302 (FIG. 3) may become degraded during deposition of the electrical conductor 304 (FIG. 3) thereon. If the gas propellant is insufficiently heated below 450° C., then a sufficient velocity of the gas propellant may not be achieved, and the solid powder composition may not plastically deform and adhere to the substrate 302.

The step of propelling 104 the solid powder composition that includes copper and highly oriented pyrolytic graphite using a gas propellant can be performed in any manner. In an example, the gas propellant is accelerated to a high velocity by releasing the gas propellant from a high-pressure state, such as a high-pressure gas state, a liquid state, or a solid state. Before, after, or during the acceleration of the gas propellant, the gas propellant is mixed with the solid powder composition to propel the solid powder composition.

The step of directing 106 the solid powder composition towards the substrate 302 (FIG. 3) at a velocity sufficient to cause the solid powder composition to undergo plastic deformation and to adhere to the substrate 302 to deposit the electrical conductor 304 (FIG. 3) thereon can be performed in any manner. In an example, the solid powder composition is directed towards the substrate 302 using a nozzle, such as a de Laval nozzle. Plastic deformation is a process in which permanent deformation in a solid body is caused. Plastic deformation produces a permanent change in the solid body without fracture, resulting from the application of stress beyond the elastic limit. In the present description, the solid powder composition is directed at the substrate 302 at a sufficient velocity to cause the solid powder composition to undergo plastic deformation and to adhere to the substrate 302 to deposit the electrical conductor 304. By undergoing severe plastic deformation, the solid powder composition is adhered to the substrate 302.

Figure 3:
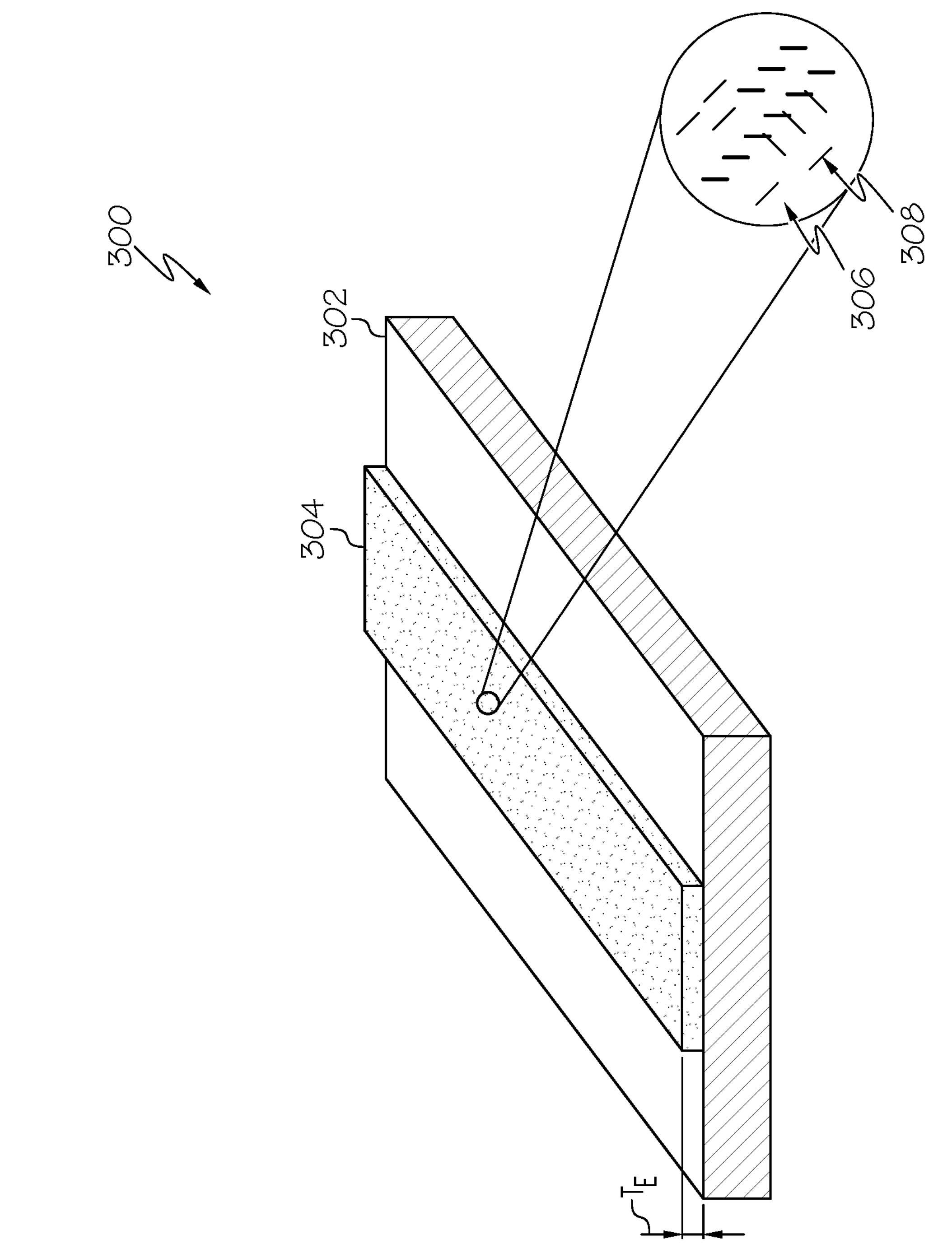
FIG. 3 is a perspective view of one example of the disclosed cold spray coated product.

In an example, the solid powder composition is directed towards the substrate 302 at a velocity of 500-1,000 m/s. If the velocity is below 500 m/s, then the solid powder composition may not undergo plastic deformation and may fail to properly adhere to the substrate 302 (FIG. 3). If the velocity is above 1,000 m/s, then the substrate 302 may become damaged upon impact.

According to the present disclosure, the solid powder composition includes copper and highly oriented pyrolytic graphite. The copper may include pure copper, copper-based alloy, or any alloy including copper. By selecting the solid powder composition to include copper, the solid powder composition can undergo plastic deformation upon impact with the substrate 302 (FIG. 3) and can adhere to the substrate 302. Furthermore, the copper contributes to the high electrical conductivity of the resulting electrical conductor 304 (FIG. 3) deposited on the substrate 302.

In an example, the copper material has a current density of approximately 500 Amps per square centimeter (500 $A/cm^2$), which makes for an ideal material for a high electrical conductivity matrix material, particularly in aircraft sustainment, aircraft repair, and aircraft life monitoring applications.

Highly oriented pyrolytic graphite (HOPG) is a highly pure and ordered form of synthetic graphite. It is characterized by the International Union of Pure and Applied Chemistry (IUPAC) Compendium of Chemical Terminology as a pyrolytic graphite with an angular spread of the c-axes of the crystallites of less than 1 degree. Highly oriented pyrolytic graphite has a high electrical conductivity. By selecting the solid powder composition to include highly oriented pyrolytic graphite, the electrical conductor 304 deposited on the substrate 302 from the solid powder composition is provided with a high electrical conductivity.

In an example, the highly oriented pyrolytic graphite includes intercalated highly oriented pyrolytic graphite, such as bromine intercalated highly oriented pyrolytic graphite. Due to the layered form of graphite, different atomic or molecular species can be inserted in-between the graphite layers. The process of inserting such a dopant species into graphite is called intercalation. Intercalation of highly oriented pyrolytic graphite is effective for altering the properties of the highly oriented pyrolytic graphite. Bromine intercalated highly oriented pyrolytic graphite has been determined to be suitable for inclusion in the solid powder composition of the present disclosure because bromine intercalated highly oriented pyrolytic graphite remains stable for long periods of time.

In an example, the particles of copper are included in an amount of 55-65% by weight. If the particles of copper are included in an amount less than 55% by weight, then the highly oriented pyrolytic graphite will not be fully captured in the copper matrix 306 (FIG. 3) and adherence of the electrical conductor 304 to the substrate 302 (FIG. 3) will deteriorate. If the particles of copper are included in an amount greater than 65% by weight, then the overall conductivity of the electrical conductor 304 (FIG. 3) is decreased and the weight of the electrical conductor 304 is increased.

In an example, the particles of copper have an average particle diameter in a range of 15 μm to 25 μm. If the average particle diameter is less than 15 μm, then the particles of copper may not adhere to the substrate 302 (FIG. 3). If the average particle diameter is greater than 25 μm, then the substrate 302 may become damaged upon impact.

In an example, a plurality of platelets of highly oriented pyrolytic graphite are included in the solid powder composition in an amount of 35-45% by weight. If the platelets of highly oriented pyrolytic graphite are included in the solid powder composition in an amount of less than 35% by weight, then the overall conductivity of the electrical conductor 304 (FIG. 3) will decrease and the weight of the electrical conductor 304 will increased. If the platelets of highly oriented pyrolytic graphite are included in the solid powder composition in an amount of greater than 45% by weight, then adherence of the electrical conductor 304 to the substrate 302 (FIG. 3) will deteriorate.

In another example, the platelets of highly oriented pyrolytic graphite have an average platelet diameter in a range of 5 μm to 25 μm. This range was determined to be optimal for maximum adhesion and maximum electrical conductivity of the electrical conductor 304.

The gas propellant is any gas propellant suitable for propelling the solid powder composition. In an example, the gas propellant is an inert gas propellant. By selecting the gas propellant as an inert gas propellant, a chemical reaction between the solid powder composition and the gas propellant can be avoided.

In another example, the inert gas propellant has an atomic number greater than 17. By selecting the gas propellant as an inert gas propellant having an atomic number greater than 17, the inert gas is provided with a suitably high density sufficient for propelling the solid powder composition. By way of example, the inert gas propellant includes argon, which has an atomic number greater than 17 and is a high cleanliness inert gas, thus resulting in less oxidation or trapped oxygen upon impact of the solid powder composition on the substrate 302 compared to helium or nitrogen. The use of argon, or other gas propellant having an atomic number greater than 17, also reduces the likelihood of inducing corrosion due to introducing dissimilar metals (e.g. introducing copper particles to a metal substrate) and maximizes the electrical conductivity of the highly oriented pyrolytic graphite by avoiding oxidation.

In another example, the electrical conductor 304 (FIG. 3) has an average thickness $T_E$ of 100-200 μm. If the average thickness $T_E$ is less than 100 μm, then the electrical conductivity of the electrical conductor 304 (FIG. 3) will decrease. If the average thickness $T_E$ is greater than 200 μm, then weight of the electrical conductor 304 (FIG. 3) will increase and the enhanced electrical conductivity effect due to inclusion of the highly oriented pyrolytic graphite will begin to decline.

Figure 2:
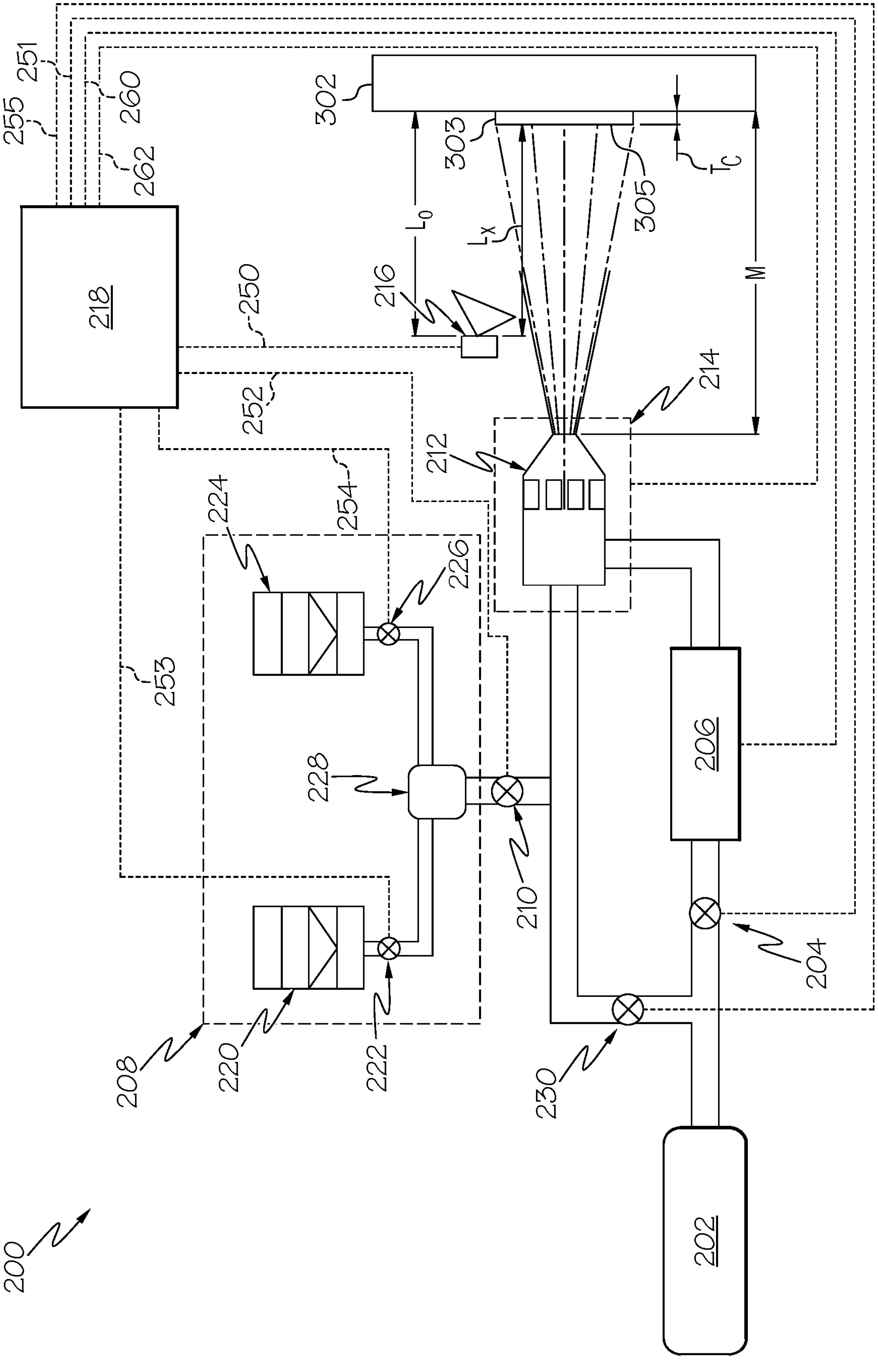
FIG. 2 is a schematic representation of one example of the disclosed system for spraying a coating material to a substrate.

FIG. 2 is a schematic representation of one example of a system 200 that may be used to implement the method 100 depicted in FIG. 1.

As shown in FIG. 2, the system 200 includes an optical sensor 216, a controller 218, a first regulator 204, a heater 206, a second regulator 210, and an actuator 214. The system 200 may further include a third regulator 222, a fourth regulator 226 and fifth regulator 230. Additional components, such as additional regulators, may be included in the system 200 without departing from the scope of the present disclosure.

The optical sensor 216 is in communication with the controller 218 by way of communication line 250. Communication line 250, like all the communication lines 251, 252, 253, 254, 255, 260, 262 in the system 200, may be wired or wireless. The optical sensor 216 may communicate to the controller 218 data that is indicative of a thickness $T_C$ of a coating material 303 applied to a substrate 302. Based at least upon the measured thickness $T_C$ of the coating material 303 applied to the substrate 302 and operator inputs, the controller 218 generates command signals to control the amount of gas propellant to be heated, the temperature to which the gas propellant is to be heated, the amount of solid powder composition to be mixed with the heated gas in a nozzle 212, and the distance M between the nozzle 212 and the substrate 302.

The first regulator 204 communicates with the controller 218 by way of communication line 251. Control of the first regulator 204 may control the amount of gas propellant supplied to the heater 206.

The heater 206 receives the gas propellant supplied by the first regulator 204, and heats the gas propellant to the required temperature, as instructed by the controller 218 via communication line 260.

The second regulator 210 is in communication with the controller 218 by way of communication line 252. Control of the second regulator 210 controls the amount of solid powder composition introduced to the gas propellant.

The actuator 214 is in communication with the controller 218 by way of communication line 262. Command signals received by the actuator 214 from the controller 218 may cause the nozzle 212 to move relative to the substrate 302. For example, the actuator 214 may move the nozzle 212 to achieve the desired distance M between the nozzle 212 and the substrate 302.

Thus, the system 200 can control the method 100 in real-time to provide for uniform results.

The system 200 may further include a tank 202 that is configured to store the gas propellant to be supplied by the first regulator 204. In one implementation, the tank 202 supplies an inert gas propellant. In the exemplary implementation, the tank 202 stores an inert gas propellant having an atomic number greater than 17 (e.g., argon).

The first regulator 204 includes any pressure or flow regulator that controls the output pressure or flow of a fluid to a desired value. For example, the first regulator 204 includes a valve. The output pressure or flow of the first regulator 204 can be adjusted based on command signals received from the controller 218 by way of communication line 251.

The heater 206 includes any heater capable of heating a gas to a controlled temperature. The temperature of the heater 206 can be adjusted based command signals received from the controller 218 by way of communication line 260. In an example, the heater 206 is an electric heater. In another example, the heater 206 is a gas-fired heater.

The system 200 may further include a feeder 208. The feeder 208 is defined as any device for storing a solid powder composition. In one example, the feeder 208 stores the mixture of particles of copper and platelets of highly oriented pyrolytic graphite described above. As such, the system 200 including a feeder 208 that stores a solid powder composition may be employed for practicing the method 100. However, the system 200 may alternatively include a feeder 208 that stores a liquid composition so that the system 200 may be employed for practicing a different method.

The second regulator 210 includes any pressure or flow regulator that controls the output pressure or flow of a fluid or the flow amount of a solid powder composition to a desired value. In one example, the second regulator 210 includes a valve and a mass sensor. By way of the mass sensor, the second regulator 210 can accurately measure an amount of a solid powder composition that passes through the second regulator 210. The amount of the solid powder composition that passes through the second regulator 210 can be adjusted based on command signals received from the controller 218 by way of communication line 252.

The system 200 furthers include a nozzle 212. The nozzle 212 can include any device suitable for releasing the solid powder composition supplied from the feeder 208 to the substrate 302 using the heated gas propellant from the heater 206. In an example, the nozzle 212 includes a de Laval nozzle, which is used to accelerate a hot, pressurized gas passing through it to a supersonic speed.

The actuator 214 can include any actuating device suitable for moving the nozzle 212 along the substrate 302 at a predetermined distance M therefrom. In an example, the actuator 214 may include a robotic actuator, such as a six-axis robotic actuator arm. Moving the nozzle 212 using the actuator 214 facilitates maintaining control of the distance M between the nozzle 212 and the substrate 302. For example, the distance M between the nozzle 212 and the substrate 302 is typically in a range of 1 to 100 mm, preferably 5 to 20 mm.

The optical sensor 216 includes any optical sensor capable of monitoring a thickness $T_C$ of the coating material 303 applied to the substrate 302 and communicating with the controller 218 (via communication line 250). The optical sensor 216, alone or in combination with the controller 218, creates a real-time visual material thickness measurement of the surface of the substrate 302. Particularly, by subtracting the detected distance $L_0$ between the sensor 216 and the substrate 302 acquired during an initial scan of the substrate 302 from the detected distance $L_X$ between the sensor 216 and the coating material 303 deposited on the substrate 302 during a subsequent scan, the thickness $T_C$ of the coating material 303 deposited on the substrate 302 over time can be determined. For example, during an initial scan, an initial distance $L_0$ would represent the distance between the sensor 216 and the substrate 302 as no coating material 303 has yet been deposited on the substrate 302. In subsequent scans, the distance $L_X$ would represent the distance between the sensor 216 and an exposed surface 305 of the coating material 303. It should be appreciated that as the thickness $T_C$ of the coating material 303 increases during the spraying process, the distance $L_X$ between the sensor 216 and the exposed surface 305 of the coating material 303 will decrease proportionally.

An exemplary optical sensor 216 may be one or more optical distance sensors that use a pulsed light signal to generate a signal (which is input to the controller 218) that represents the distance $L_X$ from the optical sensor to the exposed surface 305 of the coating material 303. The optical distance sensor operates by pulsing a light emitting diode (LED) to illuminate the target surface, which initially is the surface of the substrate 302 and subsequently the exposed surface 305 of the coating material 303, and measuring the strength of the reflected signal. The returned value will vary for the same distance as the reflectivity of the target surface varies. As the coating material 303 is applied to the substrate 302, the distance $L_X$ changes as a thickness $T_C$ of the applied coating material changes.

The controller 218 may be any apparatus, system, systems or combinations thereof (e.g., a microprocessor) that is capable of generating and communicating command signals to achieve a desired result from a controlled device. As represented by the dotted lines in FIG. 2, the controller 218 is communicatively coupled to the optical sensor 216, the first regulator 204, the second regulator 210, the heater 206, and the actuator 214.

In an example, the feeder 208 includes a first material feeder 220 storing particles of copper, a third regulator 222 controlling an amount of copper particles from the first material feeder 220, a second material feeder 224 storing platelets of highly oriented pyrolytic graphite, a fourth regulator 226 controlling an amount of highly oriented pyrolytic graphite platelets from the second material feeder 224, and a mixer 228 receiving and mixing the particles of copper supplied by the third regulator 222 and the platelets of highly oriented pyrolytic graphite supplied by the fourth regulator 226. Accordingly, the system 200 can regulate a relative amount of copper particles and platelets of highly oriented pyrolytic graphite provided from the feeder 208.

The first material feeder 220 includes any device suitable for supplying particles of copper. In an example, the first material feeder 220 is a gravity powder feeder.

The third regulator 222 includes any regulator suitable for controlling the flow amount of copper particles to a desired value. In an example, the third regulator 222 includes a valve and a mass sensor. By way of the mass sensor, the third regulator 222 can accurately measure the flow amount of copper particles that passes through the third regulator 222.

The second material feeder 224 includes any device suitable for storing platelets of highly oriented pyrolytic graphite. In an example, the second material feeder 224 is a gravity powder feeder.

The fourth regulator 226 includes any regulator suitable for controlling the flow amount of platelets of highly oriented pyrolytic graphite to a desired value. In an example, the fourth regulator 226 includes a valve and a mass sensor. By way of the mass sensor, the fourth regulator 226 can accurately measure the flow amount of platelets of highly oriented pyrolytic graphite that passes through the fourth regulator 226.

The mixer 228 includes any device suitable for mixing the copper particles passing from the third regulator 222 and the highly oriented pyrolytic graphite platelets passing from the fourth regulator 226. In an example, the mixer 228 is a circular mixer.

In another example, a portion of the gas propellant supplied from the tank 202 passes through a fifth regulator 230 (e.g., a valve) and transports the solid powder composition supplied from the feeder 208 to the nozzle 212.

By controlling the various feature of the system 200 using the controller 218 based on thickness $T_C$ of coating material 303 measured by the optical sensor 216, the system 200 can control the process in real-time to provide for uniform results when fabricating the cold spray coated product 300 using method 100 as described in the below operating steps of the system 200.

A method of operation of the system 200 by the controller 218 includes communicating to the controller 218 (via communication line 250) a signal indicative of the thickness $T_C$ of a coating material 303 applied to a substrate 302, such as by using the optical sensor 216. Based on the measured thickness $T_C$ and operator inputs, among other possible factors, the controller 218 generates command signals that control the amount of gas propellant to be heated, the temperature to which the gas propellant is to be heated, the amount of a solid powder composition to be mixed with the heated gas in a nozzle 212, and the distance M between the nozzle 212 and the exposed surface 305 of the coating material 303. The first regulator 204 receives a command signal and supplies the required amount of gas propellant. The heater 206 receives the gas propellant supplied from the first regulator, and heats the gas propellant to the desired temperature. The second regulator 210 supplies a required amount of solid powder composition. The actuator 214 moves the nozzle 212 as instructed by the controller 218 to facilitate depositing the coating material 303 on the substrate 302.

By way of example, the controller 218 may employ one or more of the following relationships to provide for more uniform results for the system 200.

$$V_g = \sqrt{\left[\frac{TR}{m_g} * \left(\frac{2\gamma}{\gamma - 1}\right) * \left(1 - \frac{P_e}{P_i}\right)^{\frac{\gamma-1}{\gamma}}\right]}$$

$V_g$—Velocity of the gas at the nozzle exit
T—Temperature of the gas before it reaches the nozzle.
R—Ideal Gas Constant=8.31 J/mol
$P_e$—Gas pressure at nozzle exit=⅕ $(P_i*V_i)/(V_e)$ optimum for metal matrix carbon-based composites
$V_i$—Volume at gas inlet
$V_e$—Volume at nozzle exit
$P_i$—Gas pressure provided to gun (Optimum for argon/composite particles would be 1-3 MPa)
$M_g$—Molecular Weight of the gas
γ—$C_p/C_v$ (isentropic expansion factor)
$C_p$—Heat capacity of the gas at constant pressure (For argon Cp=0.52)
$C_v$—Heat capacity of the gas at constant volume (For argon $C_v$=0.312)

$$V_p = V_g * \sqrt{\left[\frac{3C_D * \rho_g * x}{2D_p * \rho_p}\right]}$$

$V_p$—Velocity of the particles at the nozzle exit
$C_D$—Constant assumed to be equal to 1 in this equation
$\rho_g$—Density of gas
$\rho_p$—Average density of particles
$D_p$—Average diameter of particles
x—Distance M of nozzle to substrate $$\rho_p=(\%\ Wt_{m1}*\rho_{m1})+\lfloor(1-(\%\ Wt_{m1}))*\rho_{m2}\rfloor$$

% $Wt_{m1}$—Weight percentage of material 1 used
$\rho_{m1}$—Average density of material 1 particles
$\rho_{m2}$—Average density of material 2 particles $$M_{fp}=(\rho_p*V_e)/t$$

$M_{fp}$—Mass flow rate of the particles at the nozzle exit t—time

Putting all of this together, for the system 200 described in the present description:

$$V_p = \sqrt{\left[\frac{TR}{m_g} * \left(\frac{2C_p/C_v}{C_\rho/C_{v-1}}\right) * \left(1 - \frac{\frac{1}{5}P_i * V_i / \sqrt{\left[\frac{TR}{m_g} * \left(\frac{2C_p/C_v}{C_p/C_v - 1}\right) * \left(1 - \frac{P_e}{P_i}\right)^{\frac{C_p/C_v - 1}{C_p/C_v}}\right]}}{P_i}\right)^{\frac{C_p/C_v - 1}{C_p/C_v}}\right]} * \sqrt{\left[\frac{3C_D * \rho_g * x}{2D_p * (\%\ \mathrm{Wt}_{m1} * \rho_{m1}) + [(1 - (\%\ \mathrm{Wt}_{m1})) * \rho_{m2}]}\right]} \text{ and}$$

$$M_{fp} = \frac{(\%\ \mathrm{Wt}_{m1} * \rho_{m1}) + \lfloor (1 - (\%\ \mathrm{Wt}_{m1})) * \rho_{m2} \rfloor * V_e}{t}$$

The above equations can be utilized by the controller 218 using a lookup table for the gasses and materials used and the controller 218 can optimize the components of the system 200 in real-time to meet the desired output parameters.

An exemplary specific method of operating the system 200 to produce a cold sprayed product is provided as follows. The tank 202 is filled with a predefined quantity of propellant gas (e.g., argon), and the feeder 208 stores a mixture of particles of copper having a current density of 500 Amps per square centimeter and bromine intercalated platelets of highly oriented pyrolytic graphite.

An operator inputs into the controller 218 various initial inputs. For example, the operator inputs into the controller 218 the chemical composition of the material (e.g., copper) in the first material feeder 220 and the chemical composition (e.g., highly oriented pyrolytic graphite) of the material in the second material feeder 224, as well as the chemical composition of the substrate 302 and the desired thickness $T_E$ (FIG. 3) of the electrical conductor 304 (FIG. 3) to be formed on the substrate 302.

Upon actuating the system 200, the optical sensor 216 begins to monitor the substrate 302 and any coating material 303 applied to the substrate 302. In real-time, the optical sensor 216 communicates to the controller 218 (by way of communication line 250) a signal indicative of the thickness $T_C$ of the coating material 303 (if any) on the substrate 302.

Based on the real-time measured thickness $T_C$ of the coating material 303 on the substrate 302, as well as the various initial inputs input by the operator, the controller 218 generates various command signals to effect forming on the substrate 302 an electrical conductor 304 (FIG. 3) having the desired thickness $T_E$ (FIG. 3). The command signals are communicated to the first regulator 204 (via communication line 251), the second regulator 210 (via communication line 252), the third regulator 222 (via communication line 253), the fourth regulator 226 (via communication line 254), the fifth regulator 230 (via communication line 255), the heater 206 (via communication line 260), and the actuator 214 (via communication line 262).

Command signals communicated by the controller 218 to the first regulator 204 (via communication line 251) control the amount of gas propellant (sourced from tank 202) that is heated by the heater 206. For example, the command signals received by the first regulator 204 may cause the first regulator 204 to open, either partially or fully, thereby allowing propellant gas (e.g., argon) to flow to the heater 206.

Command signals communicated by the controller 218 to the second regulator 210, the third regulator 222, the fourth regulator 226 and the fifth regulator 230 (via communication line 252, 253, 254, 255, respectively) control the amount of a solid powder composition that is mixed with the propellant gas, as well as the chemical composition of the solid power composition. For example, in the feeder 208, the particles of copper are provided from the first material feeder 220, and the platelets of highly oriented pyrolytic graphite are provided from second material feeder 224 to the mixer 228 based on the material ratio input by the operator into the controller 218. As an example, the operator may desire to fabricate a conductor 304 (FIG. 3) having of 55-65% by weight copper and 35-45% by weight highly oriented pyrolytic graphite. In response to the operator input, the controller 218 sends a command signal (via communication line 253) to the third regulator 222 and a command signal (via communication line 254) to the fourth regulator 226. The command signals (sent via communication lines 253, 254) function to operate the third regulator 222 and the fourth regulator 226, respectively, to ensure that the desired quantity of both the particles of copper (in the first material feeder 220) and the platelets of highly oriented pyrolytic graphite (in the second material feeder 224) are provided to the mixer 228. When the second regulator 210 and the fifth regulator 230 are at least partially opened, the Cu/HOPG metal matrix composite material meets the propellant gas (e.g., argon) and is supplied to the nozzle 212.

Command signals (sent via communication line 252) function to operate the second regulator 210 to ensure that an appropriate quantity of the mixture of particles of copper and platelets of highly oriented pyrolytic graphite mixes with the propellant gas (e.g., argon) passing through the fifth regulator 230 and is transported to the nozzle 212. At the nozzle 212, the transported mixture of particles of copper and platelets of highly oriented pyrolytic graphite is mixed with the heated propellant gas from the heater 206, such that the mixture of particles of copper and platelets of highly oriented pyrolytic graphite accelerates to a velocity of 500-1,000 m/s. Thus, the mixture of particles of copper and platelets of highly oriented pyrolytic graphite is propelled using the heated gas propellant and directed by the nozzle 212 towards the substrate 302 at a velocity sufficient to cause the solid powder composition to undergo plastic deformation and to adhere to the substrate 302 to deposit the electrical conductor 304 thereon.

Thus, the transportation and composition of materials moving to the nozzle 212 can be controlled by the controller 218 by communicating command signals to the first regulator 204, the second regulator 210, the third regulator 222, the fourth regulator 226 and the fifth regulator 230.

Command signals communicated by the controller 218 to the heater 206 (via communication line 260) control the temperature to which the gas propellant is heated. For example, the controller 218 can instruct the heater 206 to heat to a temperature in a range of 450 to 535° C. Therefore, the heater 206 heats the propellant gas (e.g., argon) to a temperature in a range of 450 to 535° C., and the heated propellant gas enters the nozzle 212.

Command signals communicated by the controller 218 to the actuator 214 (via communication line 262) control the distance M between the nozzle 212 and the substrate 302.

Accordingly, the controller 218 receives real-time data from the optical sensor 216 that is indicative of thickness $T_C$ of the coating material 303 on the substrate 302 and controls the regulators 204, 210, 222, 226, 230, the heater 206, and the actuator 214, among other possible things. As a result, the cold spray coated product 300 of FIG. 3 is formed, which includes an electrical conductor 304 deposited on the substrate 302. The electrical conductor 304 on the substrate 302 that has the desired thickness $T_E$ (FIG. 3), as well as the desired chemical composition. For example, the electrical conductor 304 includes a copper matrix 306 and highly oriented pyrolytic graphite platelets 308 dispersed in the copper matrix 306.

FIG. 3 is a perspective view of one example of the disclosed cold spray coated product 300. The cold spray coated product 300 includes a substrate 302 and an electrical conductor 304 deposited on the substrate 302, such as by method 100 using system 200.

The substrate 302 may include any metal substrate or any non-metal substrate. Preferably, the substrate 302 is selected from a material suitable for resisting the heat and impact applied by the cold spray process. In one example, the substrate 302 is a metal substrate. In another example, the substrate 302 includes aluminum, titanium, or steel. In yet other examples, the substrate 302 may be formed from aluminum alloy 7075 or aluminum alloy 7050.

The electrical conductor 304 includes a copper matrix 306 and highly oriented pyrolytic graphite platelets 308 dispersed in the copper matrix 306. Accordingly, the electrical conductor 304 provides a suitable replacement for traditional copper but with better electrical performance than copper and at a lower density.

The copper matrix 306 include pure copper, copper-based alloy, or any alloy including copper. By selecting the matrix as a copper matrix 306, the copper matrix 306 contributes to the high electrical conductivity of the electrical conductor 304.

In an example, the copper matrix 306 has a current density of approximately 500 Amps per square centimeter (500 $A/cm^2$), which makes for an ideal material for a high electrical conductivity matrix material, particularly in aircraft sustainment, aircraft repair, and aircraft life monitoring applications.

In an example, the copper matrix 306 is included in the electrical conductor 304 in an amount of 55-65% by weight. If the copper matrix 306 is included in an amount less than 55% by weight, then the highly oriented pyrolytic graphite will not be fully captured in the copper matrix 306 (FIG. 3) and adherence of the electrical conductor 304 to the substrate 302 (FIG. 3) will deteriorate. If the copper matrix 306 is included in an amount greater than 65% by weight, then the overall conductivity of the electrical conductor 304 (FIG. 3) is decreased and the weight of the electrical conductor 304 is increased.

In an example, the highly oriented pyrolytic graphite platelets 308 are included in the electrical conductor 304 in an amount of 35-45% by weight. If the highly oriented pyrolytic graphite platelets 308 are included in the electrical conductor 304 in an amount less than 35% by weight, then the overall conductivity of the electrical conductor 304 (FIG. 3) will decrease and the weight of the electrical conductor 304 will increased. If the highly oriented pyrolytic graphite platelets 308 are included in the electrical conductor 304 in an amount greater than 45% by weight, then adherence of the electrical conductor 304 to the substrate 302 (FIG. 3) will deteriorate.

In an example, the highly oriented pyrolytic graphite platelets 308 include intercalated highly oriented pyrolytic graphite, such as bromine intercalated highly oriented pyrolytic graphite. Due to the layered form of graphite, different atomic or molecular species can be inserted in-between the graphite layers. The process of inserting such a dopant species into graphite is called intercalation. Intercalation of highly oriented pyrolytic graphite is effective for altering the properties of the highly oriented pyrolytic graphite. Bromine intercalated highly oriented pyrolytic graphite has been determined to be suitable for inclusion in the solid powder composition of the present disclosure.

In another example, the electrical conductor 304 has an average thickness $T_E$ of 100-200 μm. If the average thickness $T_E$ is less than 100 μm, then the electrical conductivity of the electrical conductor 304 will decrease. If the average thickness $T_E$ is greater than 200 μm, then weight of the electrical conductor 304 will increase and the enhanced electrical conductivity effect due to inclusion of the highly oriented pyrolytic graphite will begin to decline.

In an example, the electrical conductor 304 has an electrical conductivity in excess of $7\times10^7$ to $S/cm^3$, preferably in excess of $1\times10^8$ to $S/cm^3$, more preferably in excess of $1.4\times10^8$ to $S/cm^3$. In another example, the electrical conductor 304 has a density in a range of 1.0 to 8.0 $g/cm^3$, preferably in a range of 2.0 to 6.0 $g/cm^3$, more preferably in a range of 3.0 to 4.0 $g/cm^3$. Thus, the electrical conductor 304 can provide a far greater electrical conductivity and far lower density relative to pure copper.

Figure 4:
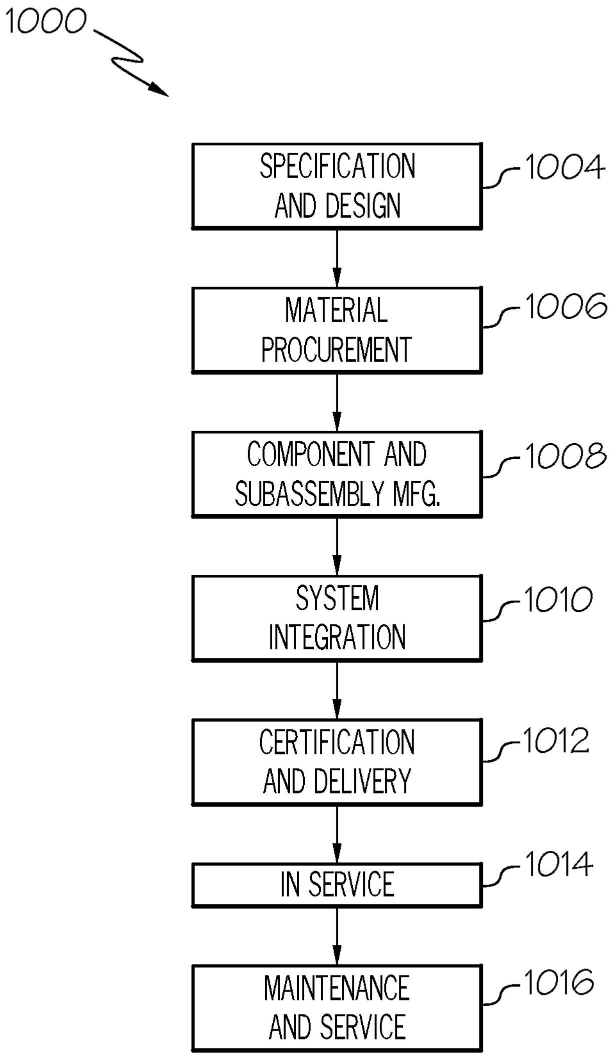
FIG. 4 is a flow diagram of an aircraft manufacturing and service methodology.
Figure 5:
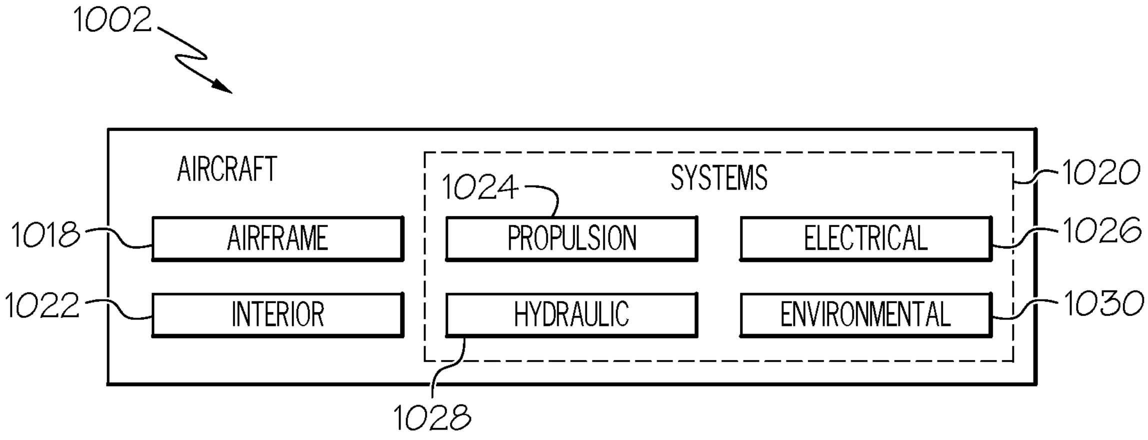
FIG. 5 is a block diagram of an aircraft.

Examples of the present disclosure may be described in the context of an aircraft manufacturing and service method 1000, as shown in FIG. 4 and an aircraft 1002, as shown in FIG. 5 During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The methods, systems, and products of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 5 the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The methods, systems, and products of the present disclosure may be employed for any of the systems of the aircraft 1002.

Although various examples of the disclosed methods, systems, and products have been shown and described, modifications may occur to those skilled in the art upon reading the specification. The present application includes such modifications and is limited only by the scope of the claims.

What is claimed is:

1. A system for spraying a solid powder composition to form a coating material on a substrate, the system comprising:

an optical sensor positioned to monitor thickness of the coating material applied to the substrate;

a controller in communication with the optical sensor, the controller being configured to, based at least on the thickness, generate a first command signal corresponding to an amount of gas propellant to be heated, a second command signal corresponding to a temperature to which the gas propellant is to be heated, a third command signal corresponding to an amount of the solid powder composition to be mixed with the heated gas in a nozzle, and a fourth command signal corresponding to a distance between the nozzle and the substrate;

a first regulator receiving the first command signal and supplying an amount of gas propellant corresponding to the first command signal;

a heater receiving the amount of gas propellant supplied from the first regulator, receiving the second command signal, and heating the gas propellant to the temperature corresponding to the second command signal;

a second regulator receiving the third command signal and supplying an amount of solid powder composition corresponding to the third command signal to the nozzle; and an actuator receiving the fourth command signal and moving the nozzle along the substrate at a distance between the nozzle and the substrate corresponding to the fourth command signal.

2. The system of claim 1 further comprising a tank that is configured to store the gas propellant to be supplied by the first regulator.

3. The system of claim 2 wherein the tank supplies an inert gas propellant.

4. The system of claim 2 wherein the tank supplies an inert gas propellant having an atomic number greater than 17.

5. The system of claim 2 wherein the tank supplies argon.

6. The system of claim 2 wherein a portion of the gas propellant from the tank passes through a fifth regulator and transports the solid powder composition supplied from the second regulator to the nozzle.

7. The system of claim 1 wherein the first regulator comprises a valve.

8. The system of claim 1 wherein the second regulator comprises a valve and a mass sensor.

9. The system of claim 1 further comprising a feeder that is configured to store the solid powder composition to be supplied by the second regulator.

10. The system of claim 9 wherein the feeder stores a mixture of particles of copper and platelets of highly oriented pyrolytic graphite.

11. The system of claim 10 wherein the feeder comprises:

a first material feeder storing particles of copper;

a third regulator supplying an amount of copper particles from the first material feeder;

a second material feeder storing platelets of highly oriented pyrolytic graphite;

a fourth regulator supplying an amount of highly oriented pyrolytic graphite platelets from the second material feeder; and a mixer receiving and mixing the particles of copper supplied by the third regulator and the platelets of highly oriented pyrolytic graphite supplied by the fourth regulator.

12. The system of claim 11 wherein the third regulator comprises a valve and a mass sensor.

13. The system of claim 11 wherein the fourth regulator comprises a valve and a mass sensor.

14. The system of claim 11 wherein the second material feeder stores platelets of intercalated highly oriented pyrolytic graphite.

15. The system of claim 1 wherein the substrate is a metal substrate.

16. The system of claim 1 wherein the coating material comprises a copper matrix and highly oriented pyrolytic graphite platelets dispersed in the copper matrix.

17. The system of claim 1 wherein the coating material has a density in a range of 3.0 to 4.0 g/cm$^3$.

18. The system of claim 1 wherein the coating material has an electrical conductivity in excess of $1.4\times10^8$ to S/cm$^3$.

19. A system for spraying a solid powder composition to form a coating material on a metal substrate, the coating material comprising a copper matrix and highly oriented pyrolytic graphite platelets dispersed in the copper matrix, the system comprising:

an optical sensor positioned to monitor thickness of the coating material applied to the metal substrate;

a controller in communication with the optical sensor, the controller being configured to, based at least on the thickness, generate a first command signal corresponding to an amount of gas propellant to be heated, a second command signal corresponding to a temperature to which the gas propellant is to be heated, a third command signal corresponding to an amount of the solid powder composition to be mixed with the heated gas in a nozzle, and a fourth command signal corresponding to a distance between the nozzle and the metal substrate;

a first regulator receiving the first command signal and supplying an amount of gas propellant corresponding to the first command signal;

a heater receiving the amount of gas propellant supplied from the first regulator, receiving the second command signal, and heating the gas propellant to the temperature corresponding to the second command signal;

a second regulator receiving the third command signal and supplying an amount of solid powder composition corresponding to the third command signal to the nozzle, the solid powder composition comprising particles of copper and platelets of intercalated highly oriented pyrolytic graphite; and an actuator receiving the fourth command signal and moving the nozzle along the metal substrate at a distance between the nozzle and the metal substrate corresponding to the fourth command signal.

20. The system of claim 19, wherein the first regulator comprises a valve.

* * * * *